(12) United States Patent
Motohashi

(10) Patent No.: US 7,050,829 B2
(45) Date of Patent: May 23, 2006

(54) METHOD AND APPARATUS FOR SENDING BATTERY CAPACITY LEVEL BETWEEN RADIO COMMUNICATION DEVICES

(75) Inventor: Teruyuki Motohashi, Tokyo (JP)

(73) Assignee: NEC Corporation, Tokyo (JP)

( * ) Notice: Subject to any disclaimer, the term of this patent is extended or adjusted under 35 U.S.C. 154(b) by 457 days.

(21) Appl. No.: 10/093,400

(22) Filed: Mar. 11, 2002

(65) Prior Publication Data

US 2002/0132649 A1 Sep. 19, 2002

(30) Foreign Application Priority Data

Mar. 16, 2001 (JP) .............................. 2001-076202

(51) Int. Cl.
*H04M 1/00* (2006.01)
*H04Q 7/20* (2006.01)
*H04B 1/16* (2006.01)

(52) U.S. Cl. ................. 455/556.1; 455/556.2; 455/566; 455/571; 455/572; 455/573; 455/574; 455/425; 455/343.1

(58) Field of Classification Search .. 455/343.1–343.5, 455/425, 550.1, 556.1, 556.2, 566, 571–574, 455/127.1
See application file for complete search history.

(56) References Cited

U.S. PATENT DOCUMENTS 5,726,636 A * 3/1998 Hayes, Jr. ................. 340/636.1
6,437,699 B1 * 8/2002 Hayakawa ............... 455/343.5
6,459,896 B1 * 10/2002 Liebenow .................... 455/425
6,735,455 B1 * 5/2004 Naito et al. ................. 455/574
6,771,896 B1 * 8/2004 Tamura et al. ................ 396/57

FOREIGN PATENT DOCUMENTS

| CN | 1206316 A | 1/1999 |
|---|---|---|
| CN | 1245609 A | 2/2000 |
| CN | 1255031 A | 5/2000 |
| EP | 0 980 007 A1 | 2/2000 |
| GB | 2 341 760 A | 3/2000 |
| GB | 2 369 011 A | 5/2002 |
| JP | 3-238933 A | 10/1991 |
| JP | 10-327274 A | 12/1998 |
| JP | 2002-33874 A | 1/2002 |
| WO | WO 95/09512 A1 | 4/1995 |
| WO | WO 98/26622 A2 | 6/1998 |

* cited by examiner

*Primary Examiner*—Lee Nguyen
*Assistant Examiner*—Wen Huang
(74) *Attorney, Agent, or Firm*—Sughrue Mion, PLLC

(57) ABSTRACT

A portable telephone that includes a control unit, a memory unit, a wireless communication function unit, an imaging unit, a display unit, an operation unit, a voice input unit, a voice output unit, a battery and a power supply unit. The control unit controls the battery capacity level of the portable telephone, and information regarding the battery capacity is attached to a transmission image and the composite information is transmitted to the call destination. An alarm image stored in the memory is automatically transmitted when a battery capacity decrease alarm occurs. Therefore, the call destination is always capable of knowing the battery capacity of the sending portable telephone and the present invention can prevent the unintentional line disconnection.

41 Claims, 9 Drawing Sheets

RECEPTION IMAGE
705

702
DISPLAY DURING CALL

301 TRANSMISSION IMAGE

303 DISPLAY OF BATTERY CAPACITY LEVEL OF SOURCE STATION

302 TRANSMISSION IMAGE IN OCCURRENCE OF BATTERY CAPACITY DECREASE ALARM

303 DISPLAY OF BATTERY CAPACITY LEVEL OF SOURCE STATION

FIG.5A

DISPLAY OF BATTERY CAPACITY LEVEL OF DESTINATION MOBILE DEVICE 504

501 SCREEN DURING STAND-BY

FIG.5B

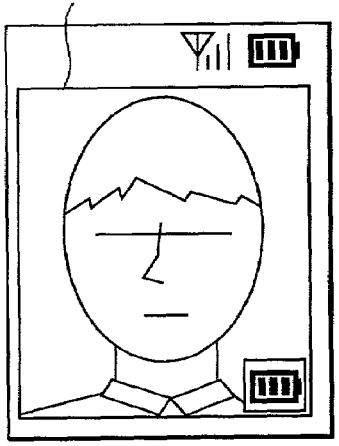

RECEPTION IMAGE 505

502 SCREEN DURING CALL

FIG.5C

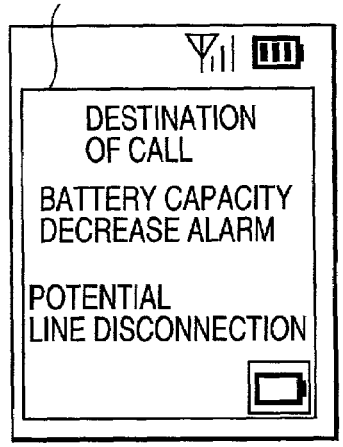

RECEPTION IMAGE 505

503 SCREEN DURING CALL IN OCCURRENCE OF BATTERY CAPACITY DECREASE ALARM

FIG.6A

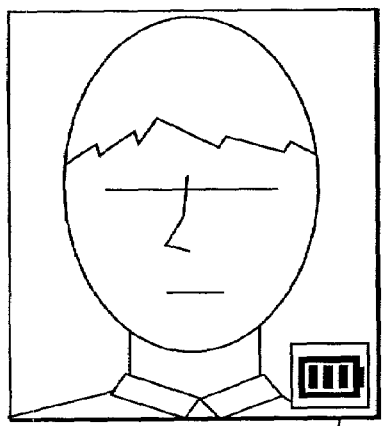

601 TRANSMISSION IMAGE

FIG.6B

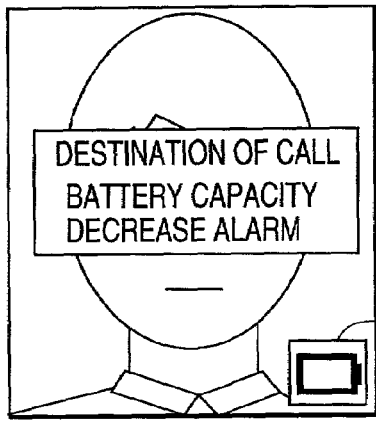

DISPLAY OF BATTERY CAPACITY LEVEL OF SOURCE STATION 603

602 TRANSMISSION IMAGE IN OCCURRENCE OF BATTERY CAPACITY DECREASE ALARM

603 DISPLAY OF BATTERY CAPACITY LEVEL OF SOURCE STATION

DISPLAY OF BATTERY CAPACITY LEVEL OF DESTINATION MOBILE DEVICE 704

701
DISPLAY DURING RECEPTION-WAITING

RECEPTION IMAGE 705

702
DISPLAY DURING CALL

RECEPTION IMAGE 705

703
DISPLAY DURING CALL IN OCCURRENCE OF BATTERY CAPACITY DECREASE ALARM

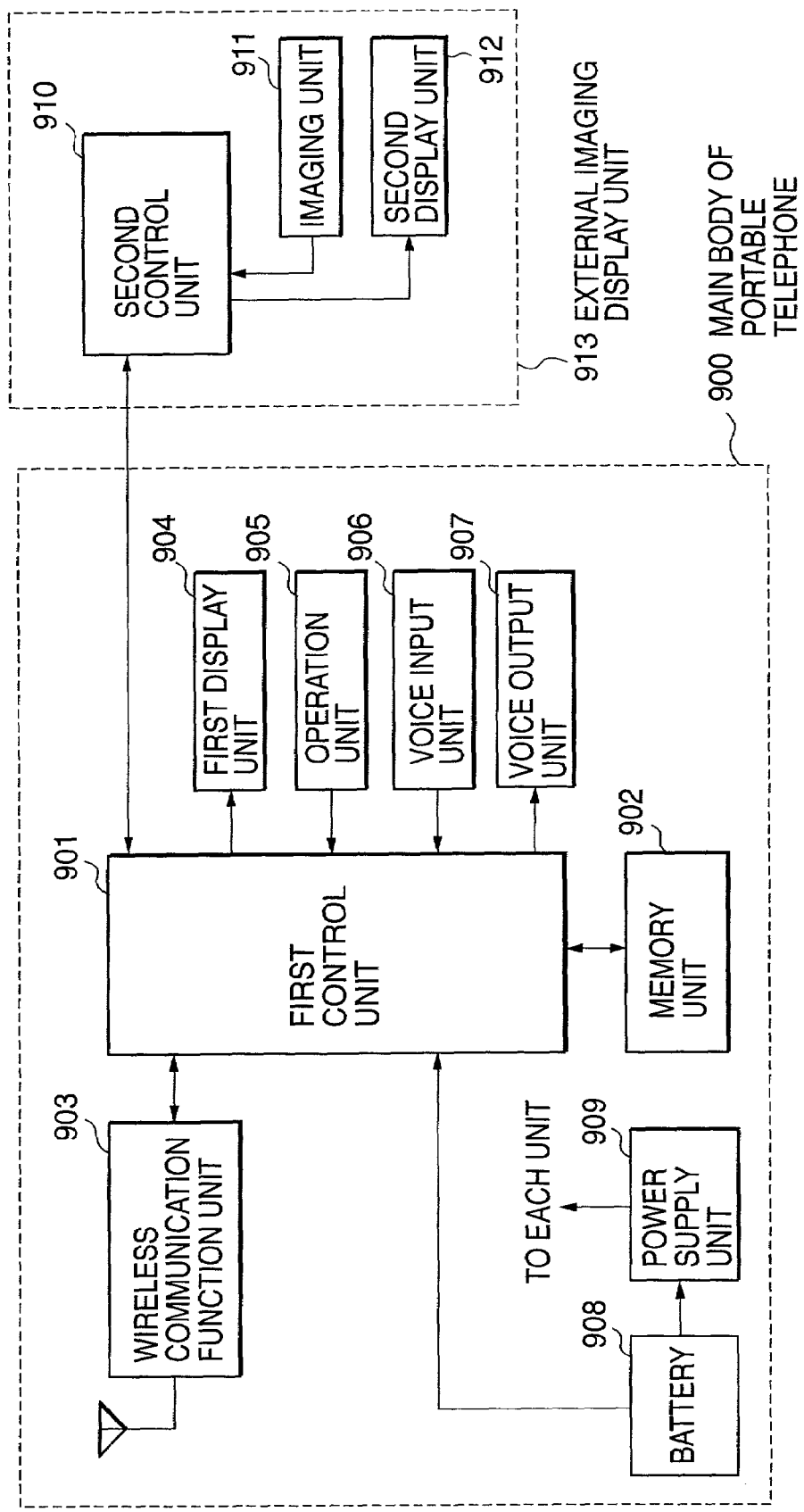

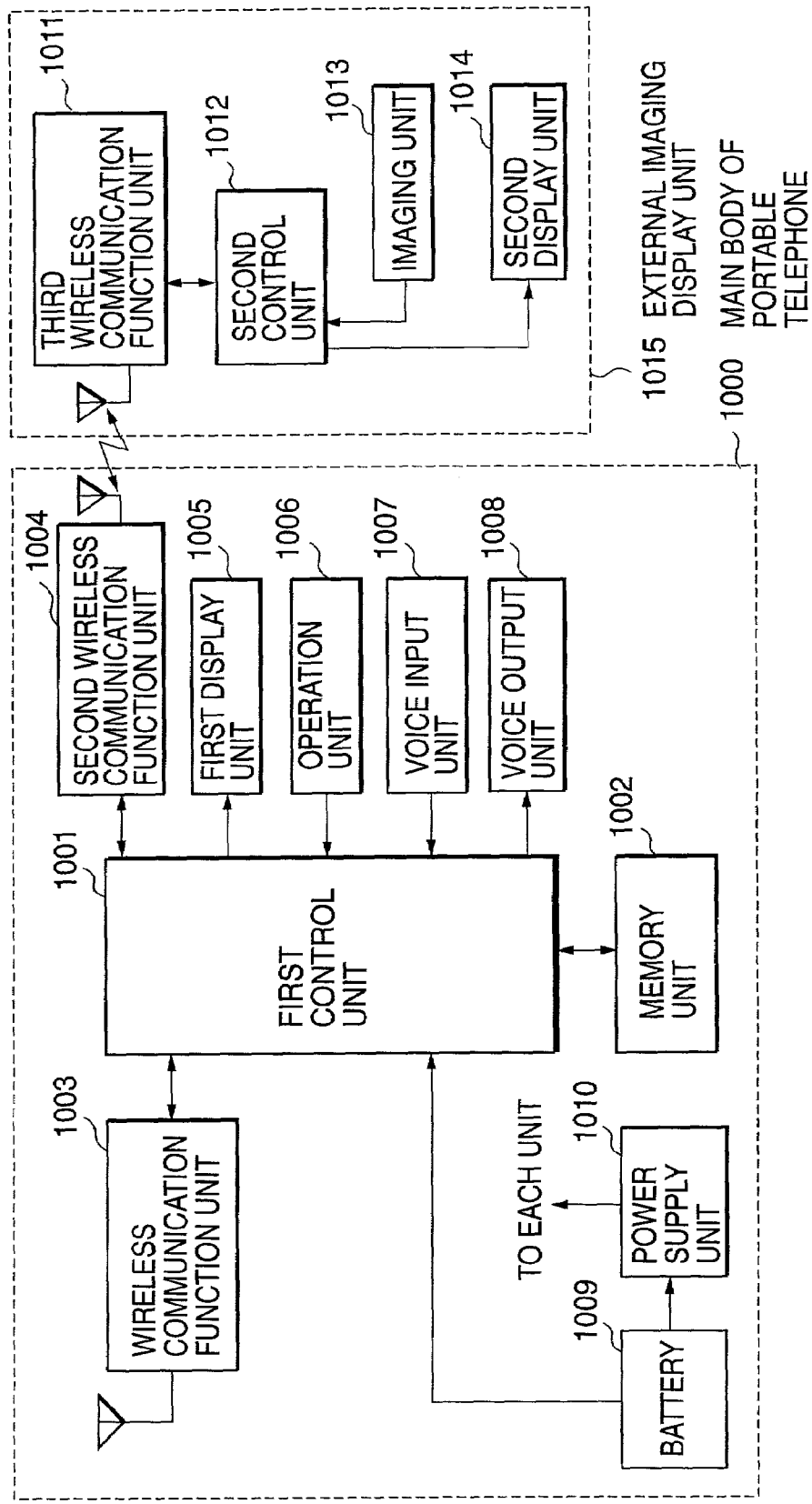

METHOD AND APPARATUS FOR SENDING BATTERY CAPACITY LEVEL BETWEEN RADIO COMMUNICATION DEVICES

BACKGROUND OF THE INVENTION

1. Field of the Invention

The present invention relates to a radio apparatus and a battery capacity notification method, and more specifically, to a portable telephone provided with imaging function and notifying a call destination of the decrease in the battery capacity of the portable telephone.

2. Description of the Related Art

A portable telephone including a video telephone function is known as a portable telephone set provided with a communication function of image information. This portable telephone having a video telephone function uses a battery that is rechargeable for its power supply. The portable telephone is capable of performing communication functions even while moving. On the other hand, the portable telephone is restricted in terms of usable time. Therefore, the battery capacity level is displayed to the user of the portable telephone and the remaining amount of the battery life is indicated to the user. When the battery capacity decreases, the portable telephone outputs a battery capacity decrease alarm and notifies the user that the power supply is turned off and the line is disconnected during a call.

However, there are problems in the above-described portable telephone. It is a first problem that the above technique has no means for being aware of the remaining amount of the battery, that is, battery capacity level of the portable telephone from the call destination. Therefore, during a call, even when the battery capacity decreases, it is impossible for the call destination to give an alarm to the portable telephone. Further, it is a second problem that, when the battery capacity decrease alarm of the portable telephone occurs, only the alarm sound is communicated to the call destination. The call destination has no means for judging whether the alarm sound is the battery capacity decrease alarm or not. Like the above-described first problem, therefore, even when the battery capacity decreases during the call, it is impossible for the call destination to give the alarm to the portable telephone.

SUMMARY OF THE INVENTION

The present invention is devised in view of the above-described problems. An aspect of the present invention is to provide a radio apparatus capable of determining the battery capacity level of the radio apparatus even from the call destination.

To achieve the above aspect, the present invention provides a radio apparatus comprising a battery, a detecting means that detects the battery capacity and a transmitting means that transmits information regarding the battery capacity detected by the detecting means. The radio apparatus further comprises an imaging means for capturing an image. The transmitting means transmits the information by attaching it to the image captured by the imaging means. Moreover, the radio apparatus further comprises a comparing means that compares the battery capacity detected by the detecting means against a predetermined value. The transmitting means transmits the information and the image when the battery capacity has reached the predetermined value. The radio apparatus further comprises a selecting means that selects whether or not the transmitting means transmits the information. The radio apparatus is preferably a portable telephone.

Moreover, a radio apparatus of the present invention comprises a battery, a detecting means that detects the battery capacity, a judging means that judges whether the battery capacity has reached a predetermined value, a notifying means that sends an alarm when the battery capacity reaches a predetermined value and a transmitting means that transmits information regarding battery capacity detected by the detecting means. The transmitting means transmits the information when the notifying means sends the alarm. The radio apparatus farther comprises an imaging means for capturing an image. The transmitting means transmits the information by attaching it to an image captured by the imaging means. The radio apparatus is preferably a portable telephone.

A radio apparatus of the present invention comprises a battery, a detector that detects the battery capacity and a transmitter that transmits information regarding the battery capacity detected by the detector. It further comprises an imaging circuit that captures an image. The transmitter transmits the information by attaching it to the image captured by the imaging circuit. Moreover, the radio apparatus further comprises a comparator that compares the battery capacity detected by the detector and a predetermined value. The transmitter transmits the information and the image when the battery capacity reaches the predetermined value. The radio apparatus further comprises a selector that selects whether or not the transmitter transmits the information. The radio apparatus is preferably a portable telephone.

A radio apparatus of the present invention comprises a battery, a detector that detects capacity, a judging circuit that judges whether the battery capacity has reached a predetermined value, a notifying circuit that sends an alarm when the battery capacity reaches the predetermined value and transmitter that transmits information regarding battery capacity detected by the detector. The transmitter transmits the information when the notifying circuit sends the alarm. The radio apparatus further comprises an imaging circuit for capturing an image. The transmitter transmits the information by attaching it to the image captured by the imaging circuit. The radio apparatus is preferably a portable telephone.

A battery capacity notification system of the present invention comprises a first radio apparatus and a second radio apparatus, wherein the first radio apparatus comprises a battery, a detecting means for detecting battery capacity and transmitting means for transmitting information regarding the battery capacity detected by the detecting means to the second radio apparatus. The second radio apparatus comprises a receiving means for receiving radio signal including the information and displaying means for displaying the information. The first radio apparatus further comprises imaging means for capturing an image. The transmitting means transmits the information by attaching it to the image captured by the imaging means. At least one of the first radio apparatus and the second radio apparatus is preferably a portable telephone.

Moreover, a battery capacity notification system of the present invention comprises a first radio apparatus and a second radio apparatus, wherein the first radio apparatus comprises a battery, a detecting means for detecting the battery capacity, a judging means for judging whether battery capacity has reached a predetermined value, notifying means that sends an alarm when the battery capacity reaches the predetermined value and a transmitting means for transmitting information regarding battery capacity detected by the detecting means to the second radio apparatus. The second radio apparatus comprises a receiving means for receiving a radio signal including the information and displaying means for displaying the information. The first radio apparatus further comprises an imaging means for capturing an image. The transmitting means transmits the information by attaching it to the image captured by the imaging means. At least one of the first radio apparatus and the second radio apparatus is preferably a portable telephone.

A battery capacity notification system of the present invention comprises a first radio apparatus and a second radio apparatus, wherein the first radio apparatus comprises a battery, a detector that detects a battery capacity and a transmitter that transmits information regarding battery capacity detected by the detector to the second radio apparatus. The second radio apparatus comprises a receiver that receives a radio signal including the battery capacity information and a display that displays the information. The first radio apparatus further comprises an imaging circuit that captures an image. The transmitter transmits the information by attaching it to the image captured by the imaging circuit. At least one of the first radio apparatus and the second radio apparatus is preferably a portable telephone.

A battery capacity notification system of the present invention comprises a first radio apparatus and a second radio apparatus, wherein the first radio apparatus comprises a battery, a detector that detects a battery capacity, a judging circuit that judges whether the batter capacity has reached a predetermined value, a notifying circuit that sends an alarm when the battery capacity reaches the predetermined value and a transmitter that transmits information regarding battery capacity detected by the detector to the second radio apparatus. The second radio apparatus comprises a receiver that receives a radio signal including the battery capacity information and a display that displays the information. The first radio apparatus further comprises an imaging circuit that captures an image. The transmitter transmits the information by attaching it to the image captured by the imaging circuit. At least one of the first radio apparatus and the second radio apparatus is preferably a portable telephone.

A battery capacity notification method of the present invention comprises capturing an image, detecting a battery capacity and transmitting information regarding the battery capacity by attaching it to the image. It further comprises selecting whether or not the information is transmitted. Moreover, a battery capacity notification method of the present invention comprises capturing an image, detecting a battery capacity, judging whether or not the battery capacity has reached a predetermined value, sending an alarm when the battery capacity reaches the predetermined value and transmitting information regarding battery capacity by attaching it to the image.

The present invention provides the radio apparatus including a function for displaying a battery capacity level and a function for sending an alarm in the case where the battery capacity decreases, and an imaging device for capturing a still image information or a moving image information therein. Moreover, the radio apparatus transmits the battery capacity state of the radio apparatus to the call destination by attaching it to the transmission image, and further automatically transmits the alarm image stored in the memory at the time when the battery capacity decrease alarm is sent. Therefore, a line disconnection during a call is prevented and a convenience of the radio apparatus is improved. Further, since the radio apparatus transmits the information as an image, the call destination can obtain the information regardless of the presence of the corresponding function.

BRIEF DESCRIPTION OF THE DRAWINGS

These and other aspects, features and advantages of the invention will become more fully apparent from the following detailed description taken in conjunction with accompanying drawings:

FIG. 5A is a diagram showing a first example of the display of the destination having received the transmitted image;

FIG. 5B is a diagram showing a first example of the display of the destination having received the transmitted image;

FIG. 5C is a diagram showing a first example of the display of the destination having received the transmitted image;

FIG. 6A shows the second example of the image transmitted from the portable telephone of the present invention during the communication by image and voice;

FIG. 6B shows the second example of the image transmitted from the portable telephone of the present invention during the communication by image and voice;

FIG. 9 is a block diagram showing a schematic configuration of the portable telephone according to the third embodiment of the present invention; and FIG. 10 is a block diagram showing a schematic configuration of the portable telephone according to the fourth embodiment of the present invention.

DETAILED DESCRIPTION OF THE INVENTION

Hereinafter, each embodiment of the present invention will be described in detail with reference to the drawings.

Figure 1:
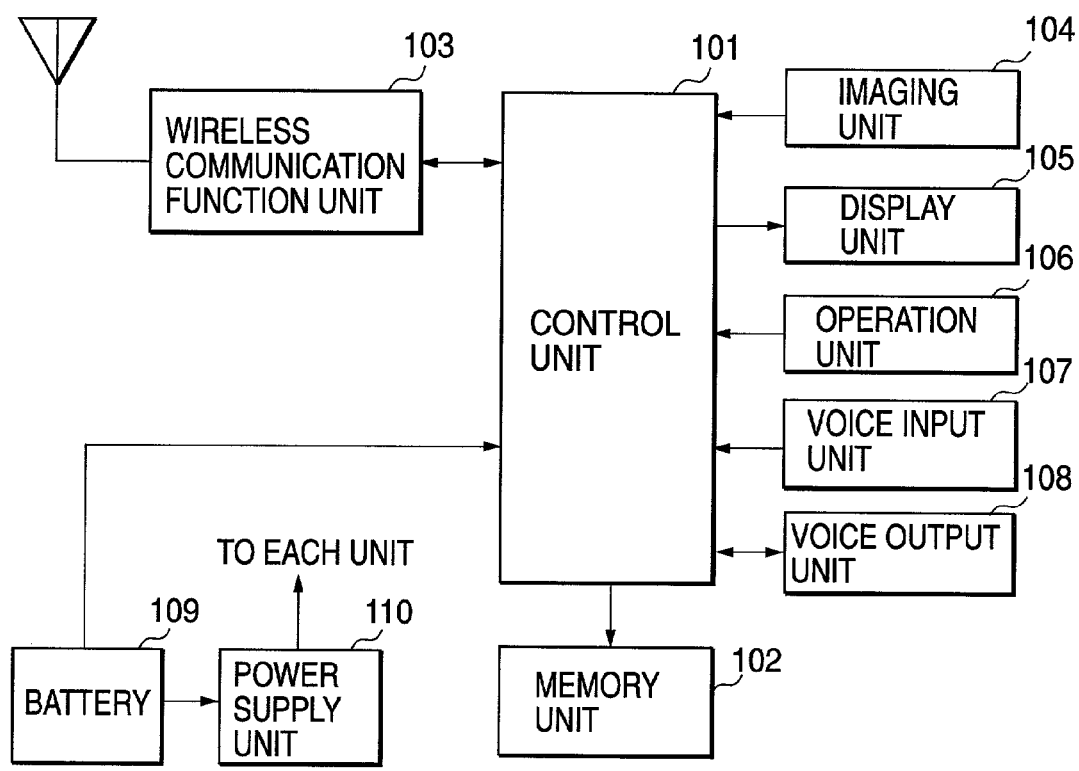
FIG. 1 is a block diagram showing the schematic configuration of the radio apparatus, preferably the portable telephone of the present invention.

FIG. 1 is a block diagram showing the schematic configuration of the radio apparatus, preferably the portable telephone of the present invention. In FIG. 1, the portable telephone of the present invention comprises a control unit 101, a memory 102, a wireless communication function unit 103, an imaging unit 104, a display unit 105, an operation unit 106, a voice input unit 107, a voice output unit 108, a battery 109 and a power supply unit 110. The control unit 101 manages the operational control of each unit based on the control programs stored in the memory 102. The memory 102 stores the above-described control programs, as well as various kinds of image data. The wireless communication function unit 103 implements wireless communication functions. The imaging unit 104 includes a CCD camera or similar circuitry. The imaging unit 104 takes a still image or a moving image and converts them into digital signals. The display unit 105 is composed of a LCD or similar display, and displays an image or a character. The operation unit 106 is composed of a keyboard and various kinds of function keys. The voice input unit 107 is a microphone for receiving voice inputs. The voice output unit 108 is a receiver or a speaker for performing a voice output. The battery 109 supplies power for operating the portable telephone. The power supply unit 110 stabilizes the battery 109, and includes a function for distributing power to each of the above-described units.

Figure 2:
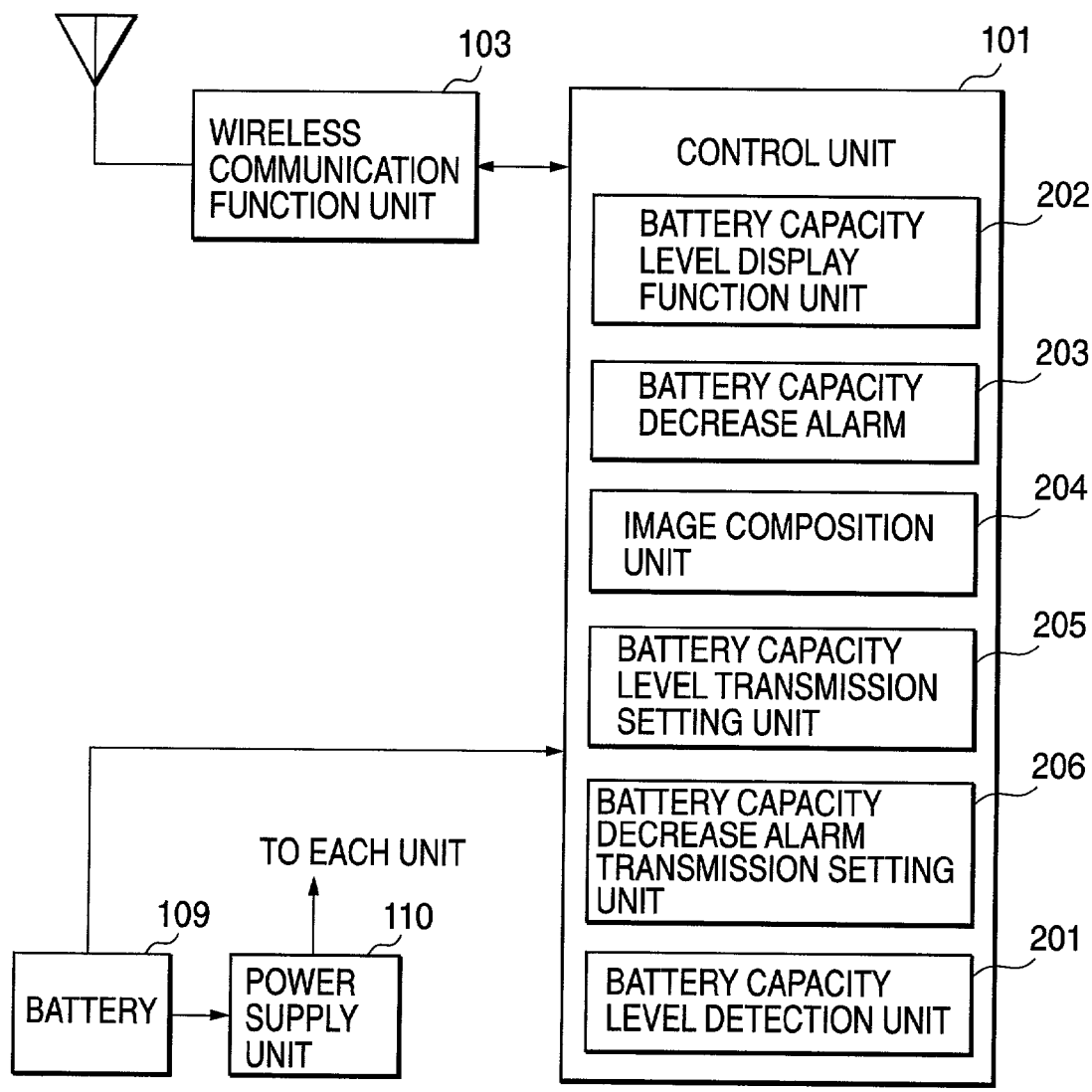
FIG. 2 is a block diagram showing the detailed configuration of the control unit 101 in FIG. 1.

FIG. 2 is a block diagram showing the detailed configuration of the control unit 101 in FIG. 1. In FIG. 2, the control unit 101 comprises a battery capacity level detection unit 201, a battery capacity level display function unit 202, a battery capacity decrease alarm 203, an image composition unit 204, a battery capacity level transmission setting unit 205, and a battery capacity decrease alarm transmission setting unit 206. The battery capacity level detection unit 201 monitors the voltage of the battery 109. The battery capacity level display function unit 202 displays the battery capacity level, i.e., the remaining amount of battery capacity on the display unit 105 based on the information of the battery capacity detected by the battery capacity level detection unit 201. The battery capacity decrease alarm 203 performs a judgment by comparing the battery capacity level detected by the battery capacity level detection unit 201 with the predetermined value. When the battery capacity decrease alarm 203 judges that the battery capacity level is the same as or smaller than the predetermined value, it instructs the display unit 105 to perform an alarm display or the voice output unit 108 to cause an alarm sound. The image composition unit 204 composes images to be outputted as transmission images by composing a still image or a moving image captured by the imaging unit 104 and an image which is subjected to a display of the battery capacity decrease alarm, or which is stored in the memory unit 102. The battery capacity level transmission setting unit 205 sets whether the operation unit 106 attaches the battery capacity level to the transmission image. The battery capacity decrease alarm transmission setting unit 206 sets whether the alarm image is to be transmitted as the transmission image in the case where the battery capacity decrease alarm occurs.

The control unit 101 displays the battery capacity level on the display unit 105. In course of communicating images, the control unit 101 controls transmission of the image captured by the imaging unit 104, by attaching the display of the battery capacity level thereto, as the transmission image to the call destination. Further, the control unit 101 controls the attachment of the alarm image stored in the memory 102 to the image captured by the imaging unit 104 or the alternative transmission of the alarm image as the transmission image in the case where the battery capacity decreases and the battery capacity decrease alarm occurs.

The operation during a normal communication of the portable telephone of the present invention will be described below. When the battery capacity level detection unit 201 measures the voltage of the battery 109, the control unit 101 obtains the battery capacity, i.e., information of a remaining amount of battery capacity. The battery capacity level display unit 202 of the control unit 101 displays the result on the display unit 105 as the display of the battery capacity level. The communication by an image and voice is realized, when the control unit 101 transmits the image captured by the imaging unit 104 and the voice input by the voice input unit 107, displays the received image on the display unit 105, and outputs the received voice by the voice output unit 108. The operation unit 106 conducts the operation relating to this call.

Figure 3A:
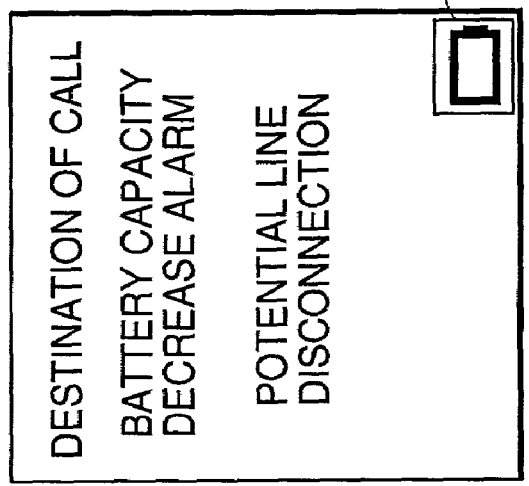
FIG. 3A is an exemplary image transmitted from the portable telephone of the present invention.

In FIG. 3A, the image transmitted from the portable telephone of the present invention is shown as a transmission image 301 during the communication by an above-mentioned image and voice. As shown in FIG. 3A, the transmission image 301 becomes such an image as that the image composition unit 204 of the control unit 101 adds a display of a battery capacity level 303 of the portable telephone to the image, e.g., a portrait captured by the imaging unit 104. Note that this composite image is made when the owner of the portable telephone commands (by setting of the operation unit 106) that the display of the battery capacity level of the portable telephone is transmitted. When the owner of the portable telephone does not choose to transmit the display of the battery capacity level of the portable telephone to the call destination, the battery capacity level of the source station is not transmitted and only the image captured by the imaging unit 104 is transmitted. This transmission image is controlled based on the setting in the transmission setting unit of a battery capacity level 205 inside the control unit 101.

Figure 3B:
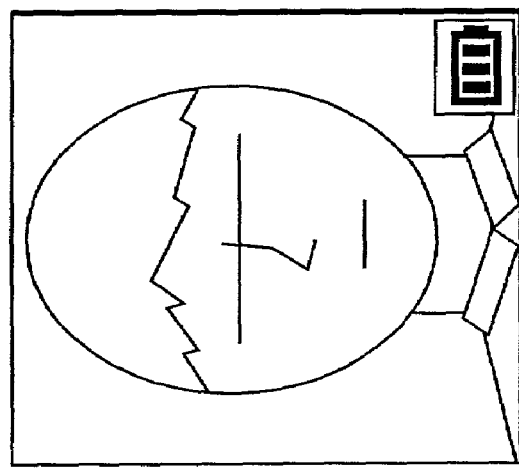
FIG. 3B is an exemplary image transmitted from the portable telephone of the present invention.

Next, the operation during an occurrence of a battery capacity decrease alarm of the portable telephone of the present invention will be described. When the battery capacity level becomes less than the predetermined threshold value, the battery capacity decrease alarm 203 of the control unit 101 sounds an alarm in a receiver or the voice output unit 108. In FIG. 3B, the image transmitted from the portable telephone according to the present invention is shown as a transmission image 302 while the above-described battery capacity decrease alarm occurs. As shown in FIG. 3B, the transmission image 302 is not the image captured by the imaging unit 104. The control unit 101 reads out the still image stored in the memory 102, and the transmission image 302 is transmitted as the transmission image. Note that this transmission image 302 is transmitted when the owner of the portable telephone commands (by setting of the operation unit 106) that the still image is transmitted while the battery capacity decrease alarm occurs in the portable telephone. When the owner of the portable telephone chooses not to transmit the still image, the still image is not transmitted and only the captured image is transmitted. This transmission image is controlled based on the setting in the transmission setting unit of a battery capacity decrease alarm 206 inside the control unit 101.

Figure 4:
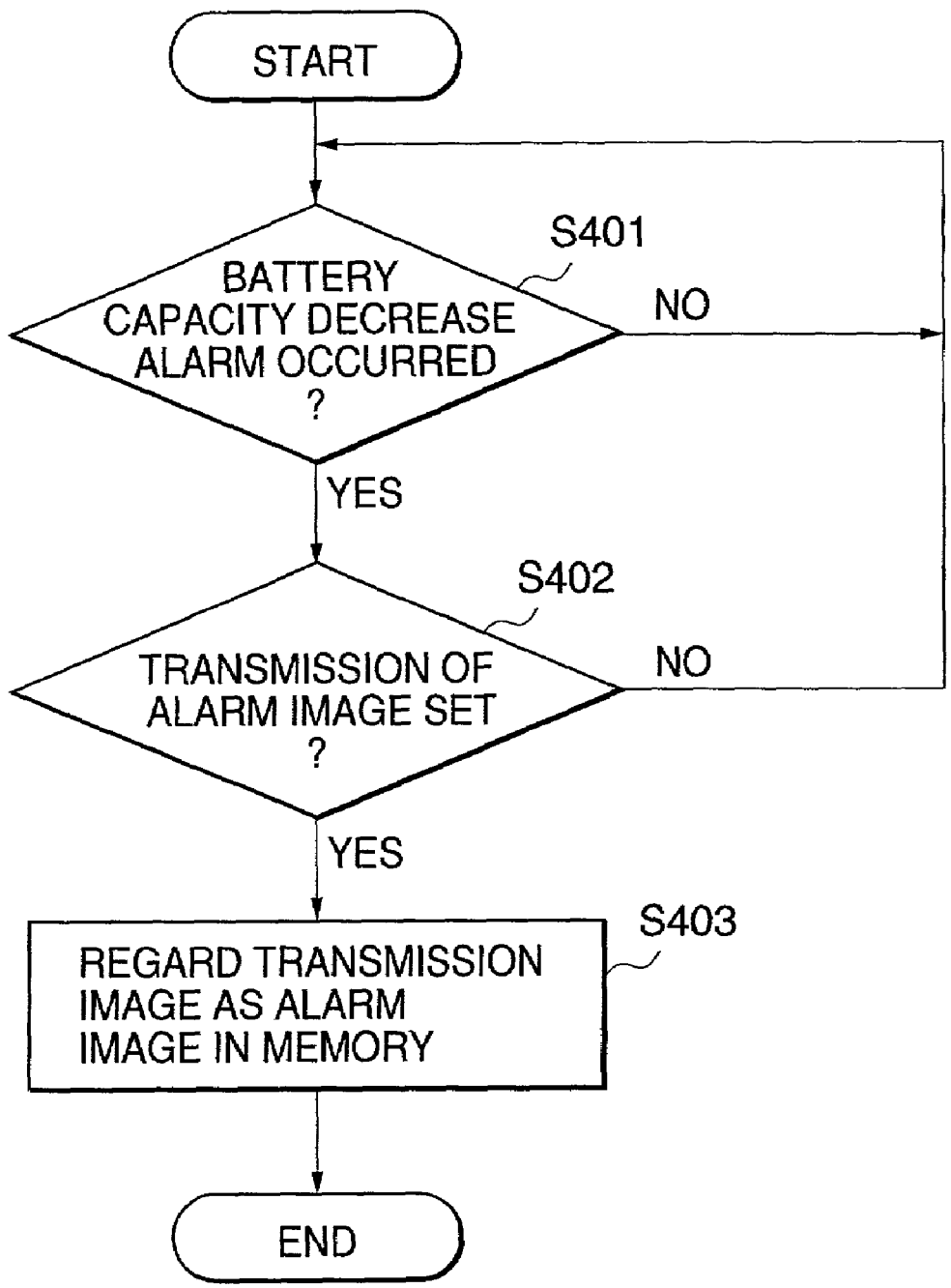
FIG. 4 is a flowchart showing an example of the operation of the portable telephone of the present invention.

FIG. 4 is an exemplary flowchart showing the operation of a portable telephone according to the present invention. First, when starting the communication by an image and voice, the portable telephone judges whether the battery capacity decrease alarm has occurred (S401). In the case of no battery capacity decrease alarm (NO at S401), the portable telephone repeats the judging process of S401. Alternatively, In the case of battery capacity decrease alarm (YES at S401), the portable telephone judges whether transmitting the alarm image as the transmission image is enabled or not (S402). In the case of no enablement (NO at S402), the processing moves to S401. In the case of enablement (YES at S402), the control unit 101 regards the alarm image stored in the memory 102 as the transmission image (S403).

FIGS. 5A, 5B and 5C are diagrams showing a first example of the display of the destination having received the transmitted image. As shown in a screen during stand-by 501 (FIG. 5A), a display of a battery capacity level 504 of the portable telephone is displayed on the screen display during stand-by of the portable telephone of the call destination. On a screen during a call 502 of the portable telephone of the call destination, as shown in FIG. 5B, a reception image 505 is displayed with a battery capacity level 504 and further the battery capacity level of the portable telephone is also displayed in the reception image 505. Therefore, the call destination of the portable telephone is also capable of checking the battery capacity level of the portable telephone. When the battery capacity decrease alarm occurs in the portable telephone, as shown in FIG. 5C, a screen during a call 503 of the portable telephone of the call destination shows the alarm screen indicating that the battery capacity decrease alarm has occurred in the portable telephone. Therefore, the call destination is capable of checking visually for a potential line disconnection.

In the exemplary embodiment of the present invention, when the battery capacity decrease alarm occurs, the case where the still image is read out from the memory 102 as the transmission image is described. However, the moving image is also applicable. When the moving image is used as the transmission image, the portable telephone can command more attention than the still image.

Figure 7A:
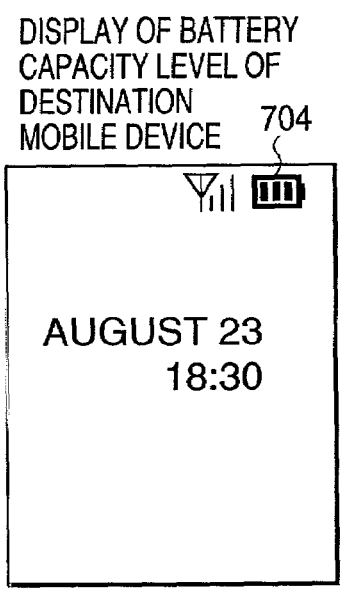
FIG. 7A is a diagram showing an example of the display of the destination having received the transmitted image.
Figure 7B:
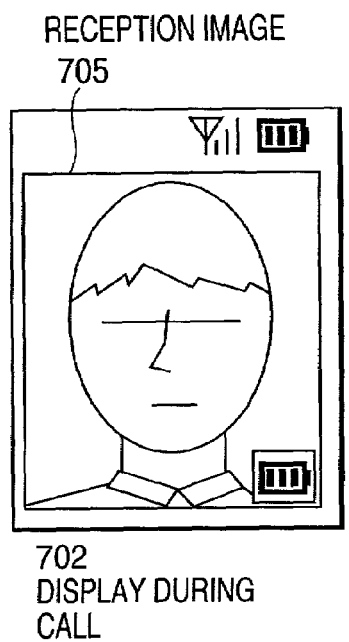
FIG. 7B is a diagram showing an example of the display of the destination having received the transmitted image shown in FIG. 6A.
Figure 7C:
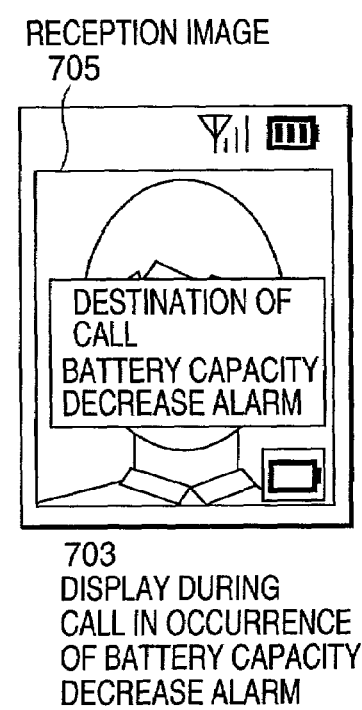
FIG. 7C is a diagram showing an example of the display of the destination having received the transmitted image shown in FIG. 6B.

FIGS. 6A and 6B show the second example of the image transmitted from the portable telephone of the present invention during the communication by image and voice. FIGS. 7A, 7B and 7C are diagrams showing an example of the display of the destination having received the transmitted image shown in FIGS. 6A and 6B. In FIGS. 6A and 6B, the control unit 101 reads out the still image in the memory 102, in addition to the image (for example, a portrait) captured by the imaging unit 104. The image composition unit 204 of the control unit 101 composes both images and makes a transmission image 602. Therefore, as described above, the reception image of the destination becomes an example of display during a communication 703 in occurrence of a battery capacity decrease alarm as shown in FIG. 7C. Therefore, the portable telephone in this case is also capable of continuously judging the image captured by the imaging unit 104.

Figure 8:
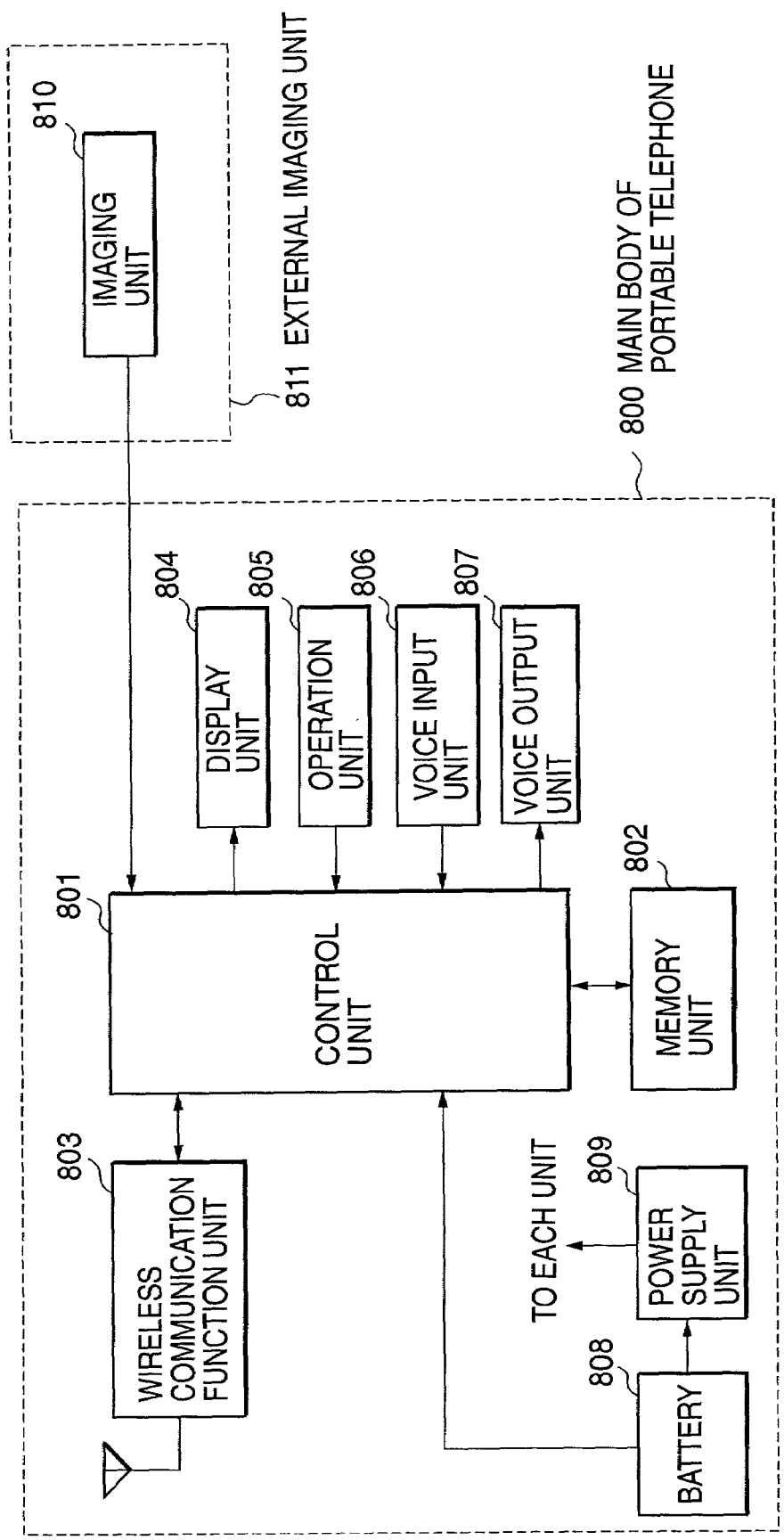
FIG. 8 is a block diagram showing a schematic configuration of the portable telephone according to the second embodiment of the present invention.

FIG. 8 is a block diagram showing a schematic configuration of the portable telephone according to the second embodiment of the present invention. In FIG. 8, as in the above-described the first embodiment, a main body of a portable telephone 800 is composed of a control unit 801, a memory 802, a wireless communication unit 803, a display unit 804, and an operation unit 805, a voice input unit 806, a voice output unit 807, a battery 808, a power supply unit 809 and an imaging unit 810. However, the imaging unit 810 composed of a CCD camera or similar circuitry is not included in the main body of the portable telephone. As required, the imaging unit 810 is connected with a connecting terminal of the main body of a portable telephone 800 as an external imaging unit 811. Note that there is a difference in that the imaging unit 810 is connected to the main body of a portable telephone 800 as the external imaging unit 811 between the above-described embodiments and the present embodiment. However, the practical operation in the present embodiment is similar to that in the above-described embodiments.

FIG. 9 is a block diagram showing a schematic configuration of the portable telephone according to the third embodiment of the present invention. In FIG. 9, comparing a main body of a portable telephone 900 according to the third embodiment of the present invention with that in the above-described second embodiment of the present invention, there is a difference in that the main body of a portable telephone 900 includes a second control unit 910, an imaging unit 911, a second display unit 912 as an external imaging display unit 913. The size of the display portion built in the portable telephone is generally restricted to a degree so as not to lose portability of the portable telephone. The restricted size of the display portion is too small to accomplish the purpose of the usage as a video telephone. Therefore, the second display unit 912 as well as the imaging unit 911 is externally configured. The second control unit 910 executes the display control of the second display unit 912 and the processing of the image data captured by the imaging unit 911. Note that the portable telephone according to the third embodiment may be configured so that the second display unit 912 and the imaging unit 911 are provided as the external imaging display unit 913 and the first control unit 901 integrates the control of the second display unit 912 and the imaging unit 911. The practical operation in the present embodiment is similar to that in the above-described embodiments. However, during a call with a video telephone, the reception image transmitted from the destination is displayed on the second display unit 912.

FIG. 10 is a block diagram showing a schematic configuration of the portable telephone according to the fourth embodiment of the present invention. In FIG. 10, comparing a main body of a portable telephone 1000 according to the fourth embodiment of the present invention with that in the above-described three embodiment of the present invention, there is a difference in that the main body of a portable telephone 1000 includes a second wireless communication function unit 1004 and a third wireless communication function unit 1011.

In this configuration, the main body of a portable telephone 1000 is connected with an external imaging display unit 1015 by the wireless communication executed between the second wireless communication function unit 1004 and the third wireless communication function unit 1011. The practical operation in the present embodiment is similar to that in the above-described embodiments. However, during a call with a video telephone, the reception image transmitted from the destination is displayed on the second display unit 1014.

As is clear from the above description, the portable telephone transmits the status of the battery capacity level of the portable telephone by attaching it to the transmission image sent to the call destination, and further transmits the alarm image stored in the memory when the battery capacity decrease alarm occurs. Therefore, the portable telephone is capable of preventing disconnection of a line during a call, to thereby improve user's convenience. Further, the portable telephone can transmit the information of the battery capacity level as the image information to the call destination. Therefore, the call destination can obtain the information of the battery capacity level of the portable telephone regardless of the presence of the corresponding function of the portable telephone.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A radio apparatus, comprising:
a battery;
detecting means for detecting a battery capacity of said battery; and
transmitting means for transmitting to a call destination an image and information regarding the battery capacity detected by said detecting means, said information being displayed on said image at the call destination, and
wherein the radio apparatus further comprises imaging means for capturing said image.

2. The radio apparatus as claimed in claim 1, wherein said transmitting means transmits said information by attaching it to said image captured by said imaging means.

3. The radio apparatus as claimed in claim 2, wherein the radio apparatus further comprises comparing means for comparing said battery capacity detected by said detecting means with a predetermined value.

4. The radio apparatus as claimed in claim 3, wherein said transmitting means transmits said information and said image when said battery capacity reaches said predetermined value.

5. The radio apparatus as claimed in claim 1, wherein said radio apparatus further comprises selecting means for selecting whether or not said transmitting means transmits said information.

6. The radio apparatus as claimed in claim 1, wherein said radio apparatus is a portable telephone.

7. A radio apparatus according to claim 1, wherein said transmission means transmits said information on said image.

8. A radio apparatus, comprising:
a battery;
detecting means for detecting a battery capacity of said battery;
judging means for judging whether said battery capacity has reached a predetermined value,
notifying means for sending an alarm when said battery capacity reaches said predetermined value; and
transmitting means for transmitting to a call destination an image and information regarding said battery capacity detected by said detecting means, said information being displayed on said image at the call destination, and
wherein said radio apparatus further comprises imaging means for capturing said image.

9. The radio apparatus as claimed in claim 8, wherein said transmitting means transmits said information by attaching it to said image captured by said imaging means.

10. The radio apparatus as claimed in claim 8, wherein said radio apparatus is a portable telephone.

11. A radio apparatus, comprising:
a battery;
a detector that detects a battery capacity of said battery; and
a transmitter that transmits to a call destination an image and information regarding the battery capacity detected by said detector, said information being displayed on said image at the call destination, and
wherein said radio apparatus further comprises an imaging circuit that captures said image.

12. The radio apparatus as claimed in claim 11, wherein said transmitter transmits said information by attaching it to said image captured by said imaging circuit.

13. The radio apparatus as claimed in claim 12, wherein said radio apparatus further comprises a comparator that compares said battery capacity detected by said detector with a predetermined value.

14. The radio apparatus as claimed in claim 13, wherein said transmitter transmits said information and said image when said battery capacity reaches said predetermined value.

15. The radio apparatus as claimed in claim 11, wherein said radio apparatus further comprises a selector that selects whether or not said transmitter transmits said information.

16. The radio apparatus as claimed in claim 11, wherein said radio apparatus is a portable telephone.

17. A radio apparatus according to claim 11, wherein said transmitter transmits said information on said image.

18. A radio apparatus, comprising:
a battery;
a detector that detects a battery capacity of said battery;
a judging circuit that judges whether said battery capacity has reached a predetermined value,
a notifying circuit that sends an alarm when said battery capacity reaches said predetermined value; and
a transmitter that transmits to a call destination an image and information regarding said battery capacity detected by said detector, said information being displayed on said image at the call destination, and
wherein said radio apparatus further comprises an imaging circuit for capturing said image.

19. The radio apparatus as claimed in claim 18, wherein said radio apparatus is a portable telephone.

20. A radio apparatus, comprising:
a battery;
a detector that detects a battery capacity of said battery;
a judging circuit that judges whether said battery capacity has reached a predetermined value,
a notifying circuit that sends an alarm when said battery capacity reaches said predetermined value; and
a transmitter that transmits to a call destination an image and information regarding said battery capacity detected by said detector, said information being displayed on said image at the call destination
said transmitter transmits said information when said notifying circuit sends said alarm, and
wherein said transmitter transmits said information by attaching it to said image captured by said imaging circuit.

21. A battery capacity notification system comprising:
a first radio apparatus; and a second radio apparatus,
wherein said first radio apparatus comprises: a battery; detecting means for detecting a battery capacity of said battery; and transmitting means for transmitting an image and information regarding said battery capacity detected by said detecting means to said second radio apparatus, and
wherein said second radio apparatus comprises: receiving means for receiving a radio signal comprising said image and said information; and displaying means for displaying said information on said image, and
wherein said first radio apparatus further comprises imaging means for capturing said image.

22. The battery capacity notification system as claimed in claim 21, wherein said transmitting means transmits said information by attaching it to said image captured by said imaging means.

23. The battery capacity notification system as claimed in claim 21, wherein at least one of said first radio apparatus and said second radio apparatus is a portable telephone.

24. A battery capacity notification system comprising:
a first radio apparatus; and a second radio apparatus,
wherein said first radio apparatus comprises: a battery; detecting means for detecting a battery capacity of said battery; judging means for judging whether said battery capacity has reached a predetermined value: notifying means for sending an alarm when said battery capacity reaches said predetermined value; and transmitting means for transmitting an image and information regarding the battery capacity detected by said detecting means to said second radio apparatus, and
wherein said second radio apparatus comprises: receiving means for receiving a radio signal comprising said image and said information; and displaying means for displaying said information on said image, and
wherein said first radio apparatus further comprises imaging means for capturing said image.

25. The battery capacity notification system as claimed in claim 24, wherein said transmitting means transmits said information by attaching it to said image captured by said imaging means.

26. The battery capacity notification system as claimed in claim 24, wherein at least one of said first radio apparatus and said second radio apparatus is a portable telephone.

27. A battery capacity notification system comprising:
a first radio apparatus; and a second radio apparatus,
wherein said first apparatus comprises: a battery; a detector that detects a battery capacity of said battery; and a transmitter that transmits an image and information regarding the battery capacity detected by said detector to said radio apparatus,
wherein said second radio apparatus comprises: a receiver that receives a radio signal comprising said image and said information; and a display that displays said information on said image, and
wherein said first radio apparatus further comprises an imaging circuit that takes said image.

28. The battery capacity notification system as claimed in claim 27, wherein said transmitter transmits said information by attaching it to said image captured by said imaging circuit.

29. The battery capacity notification system as claimed in claim 27, wherein at least one of said first radio apparatus and said second radio apparatus is a portable telephone.

30. A battery capacity notification system comprising:
a first radio apparatus; and a second radio apparatus,
wherein said first radio apparatus comprises: a battery; a detector that detects a battery capacity of said battery; a judging circuit that judges whether said battery capacity has reached a predetermined value; a notifying circuit that sends an alarm when said capacity reaches said predetermined value; and a transmitter that transmits an image and information regarding the battery capacity detected by said detector to said second radio apparatus,
wherein said second radio apparatus comprises: a receiver that receives a radio signal comprising said image and said information; and a display that displays said information on said image, and
wherein said first radio apparatus further comprises an imaging circuit that captures said image.

31. The battery capacity notification system as claimed in claim 30, wherein said transmitter transmits said information by attaching it to said image captured by said imaging circuit.

32. The battery capacity notification system as claimed in claim 30, wherein at least one of said first radio apparatus and said second radio apparatus is a portable telephone.

33. A battery capacity notification method, comprising:
capturing an image;
detecting a battery capacity of a battery; and
transmitting to a call destination information regarding said battery capacity by attaching it to said captured image, said information being displayed on said captured image at the call destination.

34. The battery capacity notification method as claimed in claim 33, wherein the method further comprises selecting whether or not said information is transmitted.

35. A battery capacity notification method, comprising:
capturing an image;
detecting a battery capacity of a battery;
judging whether said battery capacity has reached a predetermined value;
sending an alarm when said battery capacity reaches said predetermined value; and
transmitting to a call destination information regarding said battery capacity by attaching it to said captured image, said information being displayed on said captured image at the call destination.

36. A radio apparatus, comprising:
a battery;
detecting means for detecting a battery capacity of said battery; and
transmitting means for transmitting to a call destination an image and information regarding the battery capacity detected by said detecting means, said information being displayed on said image at the call destination, wherein said image comprises an indication that the battery capacity is low, and
further comprising imaging means for capturing a captured image, wherein said image further comprises the captured image captured by said imaging means.

37. A radio apparatus, comprising:
a battery;
a detector that detects a battery capacity of said battery; and
a transmitter that transmits to a call destination an image and information regarding the battery capacity detected by said detector, said information being displayed on said image at the call destination,
wherein said image compromises an indication that the battery capacity is low, and
further comprising an imaging circuit which captures a captured image, wherein said image further comprises the captured image captured by said imaging circuit.

38. A radio apparatus, comprising:
a battery;
detecting means for detecting a battery capacity of said battery; and
transmitting means for transmitting to a call destination an image and information regarding the battery capacity detected by said detecting means, said information being displayed on said image at the call destination, and
wherein said image is one of an indication that the battery capacity is low and a captured image captured by said radio apparatus.

39. A radio apparatus according to claim 38, wherein said image is the indication when the battery capacity is less than a predetermined value.

40. A radio apparatus, comprising:
a battery;
detecting means for detecting a battery capacity of said battery; and
transmitting means for transmitting to a call destination an image and information regarding the battery capacity detected by said detecting means, said information being displayed on said image at the call destination, and
wherein said image is one of an indication that the battery capacity is low and a captured image captured by said radio apparatus.

41. A radio apparatus according to claim 40, wherein said image is the indication when the battery capacity is less than a predetermined value.

* * * * *